Nov. 24, 1959
F. PAWLING
2,914,195
SHOCK ABSORBERS
Filed Oct. 1, 1957
3 Sheets-Sheet 1
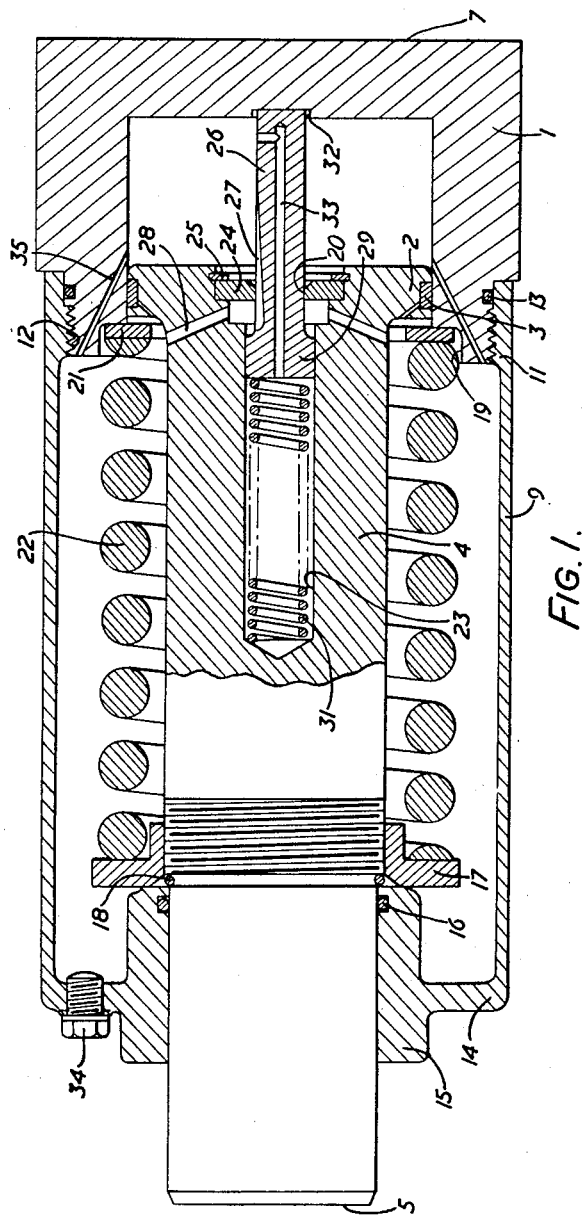
FIG. I.
INVENTOR
FRANK PAWLING
BY
Reynolds, Beach & Christensen
ATTORNEYS

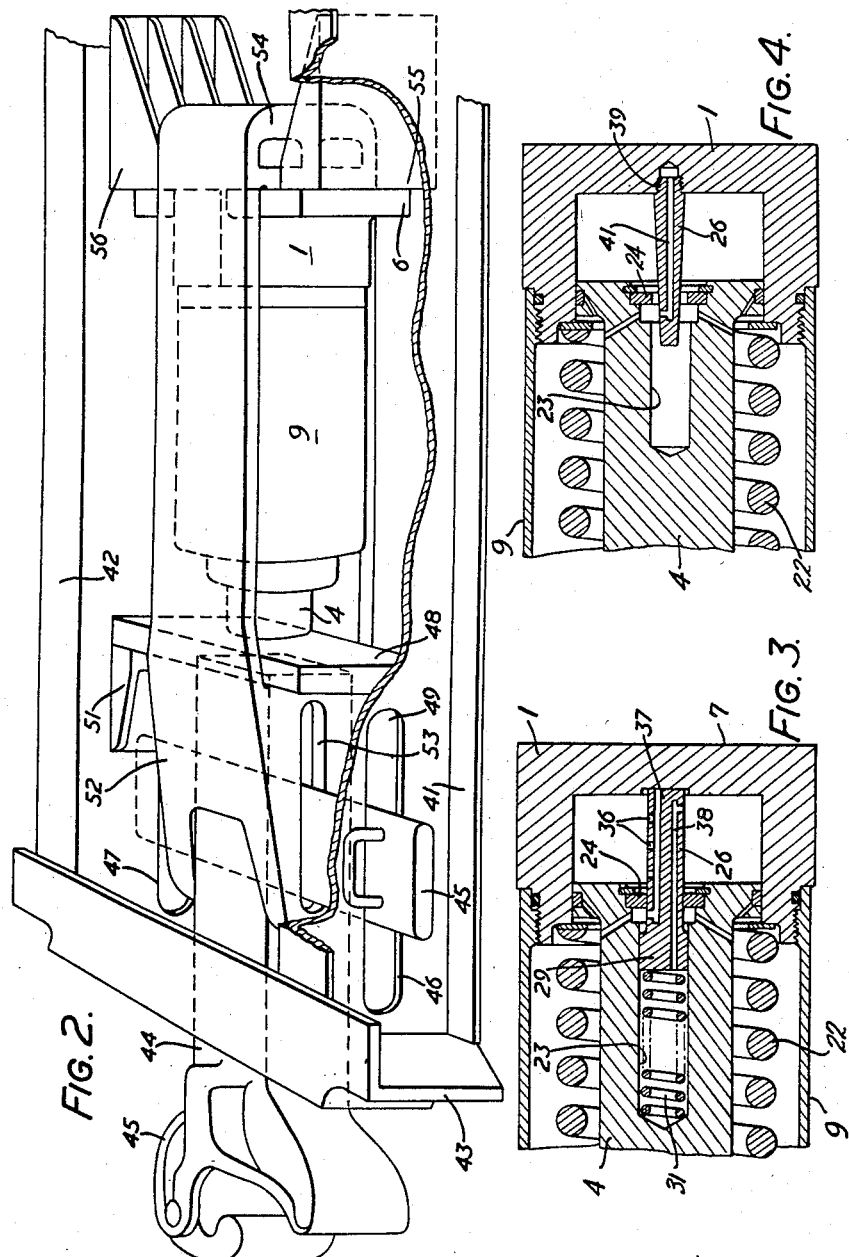

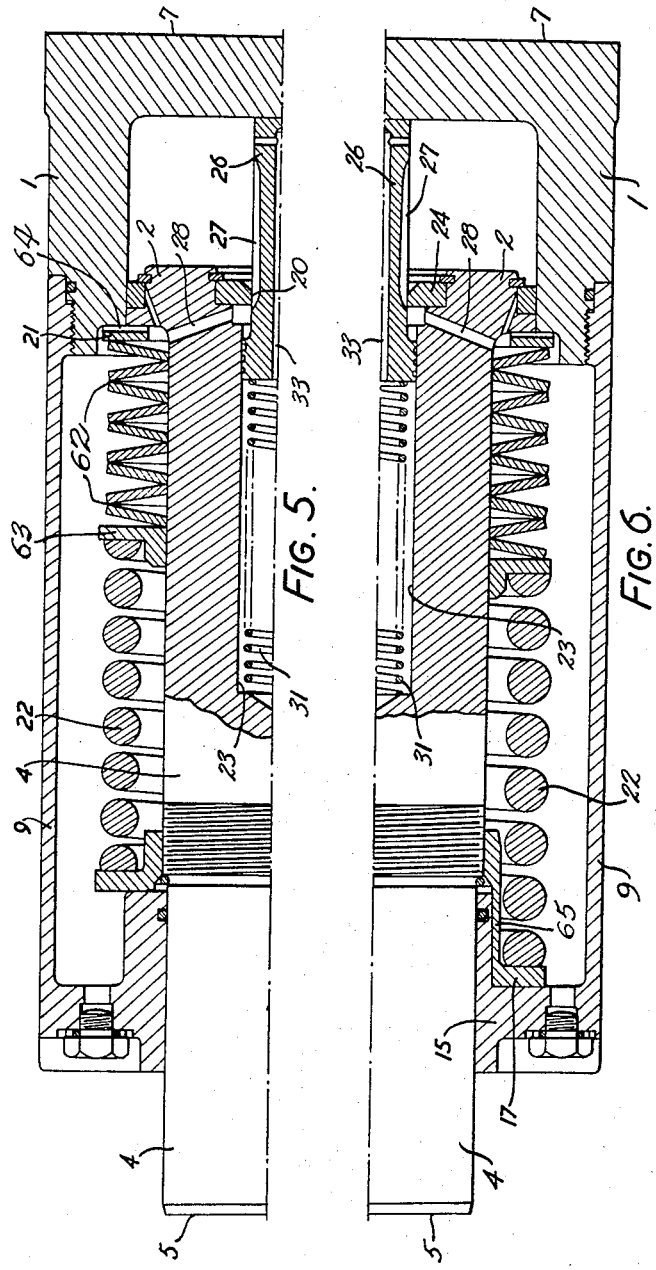

United States Patent Office 2,914,195
Patented Nov. 24, 1959

2,914,195

SHOCK ABSORBERS

Frank Pawling, Charlton Kings, Cheltenham, England, assignor to Dowty Hydraulic Units Limited, Tewkesbury, England Application October 1, 1957, Serial No. 687,496

7 Claims. (Cl. 213—43)

This invention relates to closed capsule shock absorbers for use as draught gear to absorb shocks generated between railway vehicles in a train either on acceleration or deceleration. Closed capsule shock absorbers are enclosed in a cage associated with the vehicle couplings and arranged in known manner with relatively movable parts and stops whereby the shock absorber is subjected to compression whenever the coupling is subjected either to tension or compression. Normally closed capsule shock absorbers are of long cylindrical form and operate with a comparatively short stroke. The normal operation of a closed capsule shock absorber is by means of spring and friction devices in order to absorb and dissipate shock.

The main object of this invention is to provide a closed capsule shock absorber which operates hydraulically and which is of such shape as to be a replacement for the present shock absorbers. In this way existing railway vehicles may enjoy the advantages associated with hydraulic shock absorption and dissipation.

Hydraulic side buffers are known for use on railway vehicles which comprise a piston acted on by a buffer head and located in a cylinder, a hermetically sealed reservoir located at the end of the cylinder at which the piston enters, a liquid flow restriction which controls flow of liquid from the cylinder when a buffing force acts on the buffer head and a return spring disposed externally of the reservoir to urge the piston to its outermost position. With a hydraulically-operated closed capsule shock absorber it is essential to effect expansion after a compression under all conditions of operation and for this purpose the strongest possible spring force acting over the whole stroke is necessary. It will be appreciated that the capsule must, when expanding, act against the inertia and frictional drag of the associated railway vehicles. A further object of the present invention therefore is to arrange the closed capsule shock absorber to include a return spring which because the compression stroke is short exerts a very strong force over the whole return stroke.

In accordance with the present invention, a closed capsule shock absorber of long cylindrical form and having a short stroke comprises a short thick-walled cylinder closed at its outer end and disposed at one end of the long cylindrical form, a piston in the cylinder, a piston rod extending from the piston to the opposite end of the cylindrical form, a cylindrical reservoir of outer diameter approximately the same as the outer diameter of the cylinder and extending from the cylinder towards the opposite end of the cylindrical form, a preloaded compression spring located around the piston rod and arranged to urge the piston rod axially away from the cylinder, and at least one restricted passageway extending from the working space enclosed between piston and cylinder to the reservoir. By this arrangement the spring may occupy a considerable proportion of the length of the long cylindrical form and by virtue of being preloaded will exert a very strong spring force over the whole stroke. Such a spring would have the highest possible rate compatible with this preloading, but it will be appreciated that a very high rate spring, although it might develop a very high force at full compression, would be limited in stroke and the exerted force would be low when the capsule is fully extended. When the shock absorber is disposed in its normal horizontal position a substantial part of the reservoir lies above the uppermost part of the cylinder and thus may hold sufficient liquid to ensure that the cylinder is always primed with liquid. The reservoir is preferably hermetically sealable and is arranged to enclose a volume of air slightly greater than the maximum displacement volume of the piston, whilst at all times the liquid level in the reservoir is substantially above the uppermost part of the cylinder when the shock absorber is horizontally disposed. This arrangement is achieved by the invention because the cylinder is thick-walled to resist the very high liquid pressures developed during shock absorption and the reservoir itself may thus have an internal diameter considerably greater than the internal diameter of the cylinder. The restricted passage or passages may be arranged so that the restriction to liquid flow becomes greater with movement of the piston into the cylinder whereby the deceleration of the piston during its movement into the cylinder may in operation be substantially constant during any stroke. A preferred form of restricted passage comprises a needle of tapered cross-section extending axially from the closed end of the cylinder into a closely fitting hole in the piston such that the gap through which the liquid may escape past the needle is reduced as the piston enters the cylinder. In this case a passage will extend from the rear of the hole in the piston into the reservoir to allow escape of liquid into the reservoir after it has passed the restriction. By arranging the spring around the piston rod, it may occupy the greatest possible length within the cylindrical form.

In order that the invention may be clearly understood one embodiment will be described with reference to the accompanying drawings, in which:

Figure 1 is a longitudinal cross-section through the shock absorber;

Figure 2 is a perspective view, partly broken away, of the shock absorber enclosed within the cage associated with the vehicle coupling;

Figures 3 and 4 are cross-sections of modified forms of the cylinder end of the capsule; and Figures 5 and 6 are cross-sections of modified forms of the shock absorber.

Referring to Figure 1, the thick-walled cylinder 1 is located at one end of the shock absorber and in this cylinder a piston 2 is located. The piston includes a piston ring 3 of anti-friction material which is in engagement with the cylinder wall. A piston rod 4 extends axially from the piston away from the cylinder and terminates at the opposite end at surface 5, this surface forming one of the positions where compression is applied to the shock absorber. The cylinder 1 includes a base 6 of rectangular shape whose outer surface 7 forms the other position at which compression is applied to the shock absorber. The base 6 is integral with the cylinder 1. A cylindrical reservoir 9 extends from the front end of the cylinder 1 and is secured to the cylinder by means of screw-threaded internal flange 11 which is secured to an externally threaded portion 12 at the open end of the cylinder. A sealing ring 13 disposed around portion 12 prevents leakage of liquid from the reservoir. The opposite end of the reservoir is closed by a circular end wall 14 which at its centre carries a sleeve bearing 15. The bearing 15, the plate 14 and the reservoir are integrally formed as a casting. The outer end of the piston rod 4 is constructed to be a good sliding fit within the sleeve 15 and a rubber sealing ring 16 is provided at the inner end of the sleeve to prevent liquid from escaping. The portion of the piston rod interiorly of the reservoir and adjacent to the bearing 15 is screw-threaded and carries a flange 17 which by engagement with the inner end of the bearing 15 forms a positive stop to outward movement of the piston rod. A circlip 18 is disposed in a groove around the piston rod adjacent to the flange 17 and this latter is locked against the circlip. A recess 19 is formed in the open end of the cylinder to receive a metal ring 21 whilst between the flange 17 and the ring 21 a heavy compression spring 22 extends, its coils surrounding the piston rod. This spring is preloaded when in this position and will normally exert a considerable outward force on the piston rod. In a typical example the spring may be preloaded so that at the fully extended capsule position the force is about 3,000 lbs. whilst when fully compressed in a stroke of 2⅝" the force rises to about 5,000 lbs. To achieve these forces the spring occupies practically one-half of the total length of the capsule. A higher rate or stiffer spring in this capsule might achieve a higher force at full capsule compression, but the force at full capsule extension would be too low to be useful.

From the inner end of the piston 2 a bore 23 extends along the piston rod, this bore being enlarged where it enters the piston. The enlarged portion of the bore serves to receive aperture plate 24, this latter being locked in position by means of a circlip 25. The centre of the aperture plate includes an accurately formed circular aperture 24a through which passes a cylindrical pin 26 having extending along its surface a groove 27 whose depth increases with distance away from the base of the cylinder 1. The enlargement of bore 23 immediately behind plate 24 is in communication with the interior of the reservoir by means of passages 28 so that liquid which passes through the aperture plate from the cylinder may enter the reservoir. The pin 26 has an enlarged head 29 which is an accurate fit within the bore 23 and forms a piston therein. A small compression spring 31 located within bore 23 acts on the head 29 to urge the pin outwardly from bore 23 so that the outer end of the pin 26 engages the base 7 of cylinder 1 at recess 32. An axial hole 33 extends along the pin 26 opening at one end into the bore 23 and at the other end into cylinder 1.

In order to fill the shock absorber with liquid for use it is rested in a vertical position with cylinder 1 downwards and the liquid is poured in through plug 34 in end wall 14. A predetermined quantity of liquid is inserted which is so calculated as not to fill the available space entirely, but to leave a small air space slightly greater than the displacement involved by entry of the piston rod 4 into the reservoir. When this liquid is inserted the plug 34 is screwed in to seal the whole shock absorber hermetically. The liquid is enabled to enter the cylinder when the piston rod is in its outermost position by means of passages 35 which extend from the reservoir and terminate in the wall of the cylinder adjacent the outermost position of the piston so that they are closed by the piston immediately it starts to move inwards.

In order to use the shock absorber it is placed in position in a cage formed in the draught gear of a railway vehicle and the arrangement of this cage as generally used is shown diagrammatically in Figure 2. In this arrangement a pair of U-section girders 41 and 42 form part of the underframe of the vehicle and terminate at the end in headstock 43 which is located at the end of the vehicle. A draw-bar 44 extends through headstock 43 and externally of the vehicle it carries an automatic coupling 45 of any of the usual constructions. The draw-bar 44 extends between the girders 41 and 42 and a bar 45 of elongated section passes through the draw-bar and extends into longitudinal slots 46 and 47 formed in the girders 41 and 42 respectively. The slots 46 and 47 are of considerable length and ensure that if the shock absorber fails entirely there is still mechanical connection between the draw-bar and the underframe of the vehicle. The inner end of the draw-bar 44 is normally in contact with a thrust plate 48 which extends between the girders 41 and 42 and makes contact on either side with brackets 49 and 51 secured respectively to girders 41 and 42. A yoke 52 embraces the end of the draw-bar 44 and engages the bar 45 by means of a pair of slots 53 formed in the yoke. The slots 53 are not so long as the slots 46 and 47 and in normal circumstances the yoke is urged by the shock absorber so that these slots 53 engage at one end on the bar 45. The yoke extends over the top and the bottom of the thrust plate 48 to the base 54 of the yoke which engages under the base 6 of the cylinder 1. The width of the cylinder 1 is such as to fit closely within the yoke whilst at either side of the yoke the elongated portions of the base 6 project and engage on brackets 55 and 56 respectively secured to the girders 41 and 42. It will be seen that the cage which encloses the shock absorber is formed in effect by the yoke 52, the girders 41 and 42, the thrust plate 48, and the base 54 of the yoke. When the shock absorber is in position as shown on a railway vehicle and the coupling 45 is pulled during acceleration of the train the tension will pass through the draw-bar 44, bar 45, yoke 52, yoke base 54, shock absorber, thrust plate 48, brackets 49 and 51 and girders 41 and 42, and in this way the shock absorber will be compressed in accordance with the tension applied to the coupling. In the case where the coupling 45 is pushed inwardly as when the train is decelerating the force is transmitted through the draw-bar 44, thrust plate 48, shock absorber, cylinder base 6, brackets 55 and 56 and girders 41 and 42. It will again be seen that the shock absorber will be in compression depending on the deceleration.

In considering the operation of the shock absorber itself during compression it will be seen that the compression force is applied between the surfaces 5 and 7. The compression force is transmitted along the piston rod to the piston 2 to force it into the cylinder. Initial movement of the piston will close the passages 35 after which the only escape for the liquid in the cylinder is through the aperture plate 24 into the reservoir. The pressure generated within the cylinder is transmitted through the passage 33 to the bore 23 and because of the larger cross-section of the head 29 an endwise thrust is exerted on the pin 26 to hold it against the base. The liquid will not escape other than through the portion of the hole in the aperture plate 24 as determined by the portion of the groove 27 actually engaged in the hole. In this way as the piston enters the cylinder it becomes increasingly more difficult for the liquid to escape. The shaping of the groove 27 is intended to produce uniform deceleration of the piston as it is pushed into the cylinder, the increase in the restriction compensating for the reduction in the rate of flow of liquid from the cylinder as the speed of the piston reduces thereby maintaining a substantially constant pressure in the cylinder and a substantially constant decelerating force acting between piston and cylinder. The actual value of the deceleration will of course depend on the initial relative velocity applied to the piston in the cylinder and the masses of the railway vehicles associated with the coupling. As the piston rod 4 enters the reservoir and liquid is expelled pressure in the reservoir will rise because of the reduction of the total space in the reservoir and cylinder and the resulting compression of the entrapped volume of air. If the entrapped volume of air is initially only slightly greater than the volume of piston rod 4 which may enter the reservoir then the compression of the air will aid the action of the spring 22 in pushing the piston rod away from the cylinder against the inertia and friction of the associated railway vehicles and allow the shock absorber to set itself to absorb another shock.

Referring now to Figure 3, a modified form of the pin 26 is shown in which a series of axially spaced holes 36 are provided along the pin for closure one by one as the piston enters the cylinder and to increase the restriction to flow from the cylinder. The orifices 36 all interconnect with a longitudinally extending hole 37 which opens into the recess behind the aperture plate 24 so that liquid may flow into the reservoir. A plurality of holes 37 are provided, only one of which appears in the cross-section shown. A further longitudinal passage 38 is provided in pin 26 which opens on the opposite side of plunger 29 in the bore 23 and serves to ensure that the pressure in the bore 23 is the same as the pressure in cylinder 1. The operation of this embodiment is exactly the same as described for Figure 1 other than that the restricted passage for escape of liquid from the cylinder now becomes the orifices 36.

Referring now to Figure 4, another simple modification of Figure 1 is shown. The pin 26 is constructed as a tapered pin having its largest cross-section adjacent to the base of the cylinder. In this case the pin is screw-threadedly secured into the base of the cylinder at position 39 and the free end of the pin passes through the hole in the plate 24. The bore 23 now serves the purpose only to accommodate the end of the pin 26 during depression of the piston. An axial hole 41 extends centrally down the pin 26 to the base of the screw thread 39 to ensure that the underside of the pin cannot be exposed to the high pressure which exists in the cylinder during operation. It will be appreciated that such high pressure would tend to shear the screw thread and to force the pin 26 into the piston. The operation of this embodiment is substantially as described for Figure 1 with the exception that the restriction is now formed by the space remaining between the tapered pin and the orifice plate rather than the tapered groove.

Referring now to Figure 5, a modification of Figure 1 is shown in which the compression spring 22 occupies only a part of the available length within the reservoir 9 around the piston rod 4, the remaining part of the length being occupied by a plurality of Belleville washers 62 which are arranged to be a close fit around the piston rod 4, a flange 63 slidable upon the piston rod forms a slidable abutment between spring 22 and the Belleville washers whilst at the opposite end these washers engage the metal ring 21. Belleville washers arranged end to end as shown form a well-known kind of spring which has a very high rate, i.e., returns rapidly following compression, over a small length of travel. Spring 22 is so arranged that its coils close together a short distance before the completion of the stroke of the piston within the cylinder, the spring 22 then serving to transmit the force exerted on the piston rod directly to the Belleville washers. These washers generate a much higher spring force tending to urge the piston out of the cylinder against the inertia and friction of the associated railway vehicles. This initially high force serves to overcome initial resistance to movement. Since Belleville washers would form an almost complete closure around the outlets of passage 28 the ring 21 is provided on its undersurface with a plurality of radial slots 64 which allows liquid escaping from the passages 28 to pass unhindered into the reservoir.

In Figure 5 the slot 27 in pin 26 is so arranged that the opening for escape of oil is initially quite small, but rapidly over a very small movement increases to its maximum size. The intention here is to cause the pressure to rise in the working space of the cylinder more steeply on initial reception of the impact. It is thought that the compressibility of the liquid in conjunction with the initial large escape passage prevents a rapid rise in pressure within the cylinder. By making the restriction smaller for initial movement pressure is caused to rise more rapidly and more effective use of the whole working stroke is obtained.

In the embodiment of Figure 6 more effective use of the available space within the cylinder is made by providing the flange 17 such that it extends over the bearing 15 towards the front wall of the reservoir. The screw-threaded portion of the flange 17 is here attached to the flange by means of a long cylindrical portion 65. By this means the spring 22 is lengthened whereby its preloading and its rate may be increased.

It will be appreciated that the invention is not limited to the described embodiments and that many variations are possible within the scope of the appended claims.

I claim as my invention:

1. For use with a horizontally disposed draught gear which includes two spaced abutment elements arranged for approach under the influence of applied loads, either compressional or tensional, an elongated closed-capsule shock absorber for interposition between said abutment elements, comprising a liquid-filled cylinder closed at one end and open at its other end, and disposed horizontally in use to bear at its closed end against one such abutment, a piston closely fitted and axially movable therein, and a piston rod extending from the open end of the cylinder for bearing against the second abutment; a reservoir shell extending from and constituting exteriorly an axial continuation of the open end of the cylinder, spaced from the piston rod to define a closed horizontally disposed reservoir space, a bearing and a seal surrounding the protruding piston rod and located in the end of said reservoir shell distant from the cylinder to afford support and a seal therebetween when the two slide relatively; the wall of the cylinder being thicker than the wall of the reservoir shell to afford an air space in the reservoir space above the level of the interior of the cylinder, for pneumatic absorption of the volume of the piston rod which enters the reservoir space during sliding movement of the piston into the cylinder, the reservoir space being liquid-filled except for such air space, a liquid passage affording communication between the cylinder and the reservoir space, liquid flow restricting means controlling flow from within the cylinder to the reservoir space caused by entry of the piston into the cylinder; compression spring means surrounding the piston rod and acting between the piston rod and the open end of the cylinder to urge the piston outwardly of the cylinder; and stop means interengageable between the relatively slidable elements to limit such outward movement of the piston.

2. A shock absorber as set forth in claim 1, wherein the air space within the reservoir space is of a volume in excess of the volume of the piston rod which may enter the reservoir space on maximum movement of the piston into the cylinder.

3. A shock absorber as set forth in claim 1, including a pin projecting coaxially of the piston into the cylinder, and having an enlarged head slidably disposed within a bore in the piston and piston rod, and of longitudinally varying cross-section, cooperating with a fixed aperture in the piston to constitute the liquid flow restricting means, said pin having a passage interconnecting the interior of the cylinder with the interior of its bore to urge the pin, by cylinder pressure, against the closed end of the cylinder.

4. A shock absorber as set forth in claim 1, wherein the reservoir shell is of a length exceeding the length of the cylinder, and the compression spring means occupies substantially the entire length of the reservoir space.

5. A shock absorber as claimed in claim 2, wherein the compression spring means comprises a highly preloaded helical spring and a second spring in series therewith having a higher resistance to compression than said helical spring, coils of the helical spring being sufficiently tight as to close substantially fully at less than the full shock absorber stroke in order to compress the second spring over the remainder of the stroke, to afford the high spring force of the second spring to initiate the beginning of the return movement.

6. A shock absorber as set forth in claim 5, wherein the second spring comprises a series of abutting spring washers oppositely dished.

7. An elongated closed-capsule shock absorber, intended to be disposed generally horizontally in use, and having a short shock absorbing stroke in comparison with its length, comprising a thick-welled cylinder closed at one end, a piston in the cylinder, a piston rod extending from the piston through the open end of the cylinder, a reservoir extending from the open end of the thick-walled cylinder symmetrically disposed relative to the cylinder axis and of an internal diameter approaching the outer diameter of the cylinder and greater in axial length than the cylinder, a bearing carried by the end of the reservoir opposite to the cylinder through which the piston rod extends, sealing means intermediate said bearing and the piston rod, a compression spring located in the reservoir around the piston rod extending substantially the full length of the reservoir and acting between the piston rod and the open end of the cylinder to urge the piston rod and piston outwardly, a stop carried by the piston rod and engaging the bearing at the outermost position of the piston rod and piston, liquid flow restricting means controlling liquid flow from the space enclosed within the cylinder caused by the piston moving into the cylinder, and a quantity of liquid and a sufficiently small quantity of gas enclosed by the reservoir and cylinder that when the shock absorber is disposed in its normal horizontal working position the air is wholly located in that part of the reservoir which is intermediate in level between the inner diameters of the cylinder and the reservoir.

References Cited in the file of this patent

UNITED STATES PATENTS

| | | |
|---|---|---|
| 770,537 | Raders | Sept. 20, 1904 |
| 1,494,135 | Robinson et al. | May 13, 1924 |
| 1,736,947 | Tomlinson | Nov. 26, 1929 |
| 1,955,349 | Stevens | Apr. 17, 1934 |
| 2,737,301 | Thornhill | Mar. 6, 1956 |

FOREIGN PATENTS

| | | |
|---|---|---|
| 661,107 | France | Sept. 26, 1928 |
| 296,712 | Great Britain | July 18, 1929 |

UNITED STATES PATENT OFFICE
CERTIFICATE OF CORRECTION

Patent No. 2,914,195                                    November 24, 1959

Frank Pawling

It is hereby certified that error appears in the printed specification of the above numbered patent requiring correction and that the said Letters Patent should read as corrected below.

Column 6, line 37, before "to afford" insert a comma; line 74, for the claim reference numeral "2" read -- 4 --; column 7, line 15, for "thick-welled" read -- thick-walled --.

Signed and sealed this 9th day of August 1960.

(SEAL)
Attest:

KARL H. AXLINE                                           ROBERT C. WATSON
Attesting Officer                                        Commissioner of Patents